United States Patent
Hong et al.

(10) Patent No.: US 9,003,092 B2
(45) Date of Patent: Apr. 7, 2015

(54) SYSTEM ON CHIP BUS SYSTEM AND A METHOD OF OPERATING THE BUS SYSTEM

(75) Inventors: Sung-min Hong, Hwaseong-si (KR); Jae-geun Yun, Hwaseong-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 379 days.

(21) Appl. No.: 13/403,568

(22) Filed: Feb. 23, 2012

(65) Prior Publication Data

US 2012/0221754 A1 Aug. 30, 2012

(30) Foreign Application Priority Data

Feb. 25, 2011 (KR) .................. 10-2011-0017296

(51) Int. Cl.
*G06F 12/00* (2006.01)
*G06F 13/00* (2006.01)

(52) U.S. Cl.
CPC ...................................... *G06F 13/00* (2013.01)

(58) Field of Classification Search
USPC ................ 710/200, 260–269, 240–244, 110
See application file for complete search history.

(56) References Cited

U.S. PATENT DOCUMENTS

| | | | | |
|---|---|---|---|---|
| 5,517,625 A | * | 5/1996 | Takahashi | 710/108 |
| 6,785,755 B1 | * | 8/2004 | Holm et al. | 710/110 |
| 6,816,750 B1 | * | 11/2004 | Klaas | 700/121 |
| 2004/0177205 A1 | * | 9/2004 | Schoner | 710/305 |
| 2005/0021896 A1 | * | 1/2005 | Kim et al. | 710/309 |
| 2006/0031614 A1 | | 2/2006 | Takaba | |

FOREIGN PATENT DOCUMENTS

| | | |
|---|---|---|
| JP | 2006-048530 | 2/2006 |
| JP | 2010-124439 | 6/2010 |
| KR | 1020070050214 | 5/2007 |

* cited by examiner

*Primary Examiner* — Faisal M Zaman
*Assistant Examiner* — Kim Huynh
(74) *Attorney, Agent, or Firm* — F. Chau & Associates, LLC

(57) ABSTRACT

A bus system of a system on chip (SoC) includes a first and a second masters, a first slave, and a first and a second control modules. The control modules generates a first and a second access control state signals in response to a first locking access preparation request signal from a corresponding master. The access control signals are broadcasted between the first and the second control modules through a communication channel.
A method of operating a bus system in a locked access mode includes allowing one of masters to access one of slaves through a control module and restricting other masters from accessing the one of slaves through other control modules connecting the other masters and the one of slaves in accordance with a control state signal.

2 Claims, 7 Drawing Sheets

SYSTEM ON CHIP BUS SYSTEM AND A METHOD OF OPERATING THE BUS SYSTEM

CROSS-REFERENCE TO RELATED APPLICATIONS

This application claims the benefit of Korean Patent Application No. 10-2011-0017296, filed on Feb. 25, 2011, in the Korean Intellectual Property Office, the disclosure of which is incorporated by reference herein in its entirety.

TECHNICAL FIELD

The inventive concept relates to a bus system of a system on chip (SoC), and more particularly, to a bus system of an SoC securing a freedom degree of placement and routing (P & R) under a limited floor planning design environment.

DISCUSSION OF RELATED ART

The incorporation of a larger number of intellectual properties (IPs) into a semiconductor on chip (SoC) has caused floor planning of the SoC to be restricted more, since the IPs have different sizes and different frequency characteristics. This restriction, in turn, has made placement and routing (P & R) of IPs a difficult design step. Therefore, a design method is in need to increase a freedom degree of placement and routing (P & R) under the restricted floor planning environment.

SUMMARY

In an embodiment of the inventive concept, a bus system of a system on chip (SoC) comprises a first master and a second master, a first slave, a first control module configured to connect the first master and the first slave and generate a first access control state signal in response to a first locking access preparation request signal from the first master regarding the first slave, a second control module configured to connect the second master and the first slave and generate a second access control state signal in response to a second locking access preparation request signal from the second master regarding the first slave, and a communication channel configured to connect the first control module and the second control module, transmitting the first access control signal from the first control module to the second control module and the second access control signal from the second control module to the first control module.

The first control module, in response to the first locking access preparation request signal, is configured to request an access preparation to the first slave and receive a first locking access preparation signal from the first slave. The second control module, in response to the second locking access preparation request signal, is configured to request an access preparation to the first slave and receive a second locking access preparation signal from the first slave. The first control state signal is generated as the first control module receive the first locking access preparation signal from the first slave, and the second control state signal is generated as the second control module receive the second locking access preparation signal from the first slave. The second control state signal blocks the first master from accessing the first slave, and the first control state signal blocks the second master from accessing the first slave.

The first control module and the second control module each further comprises a read access handler configured to control a read channel for read access from a corresponding master, and a write access handler configured to control a write channel for write access from a corresponding master. The first control module further comprises a synchronizing unit configured to represent a control state of the first control module. The second control module further comprises a synchronization unit configured to represent a control state of the second control module. The control state includes an idle state, a locking state, a locked state, and an unlocking state. The first control module further comprises an updating unit configured to update the control state of the first control module. The second control module further comprises an updating unit configured to update the control state of the second control module.

The first control module further comprises a signal generating unit configured to generate a first control state signal based on the updated control state of the first control module, and the second control module further comprises a signal generating unit configured to generate a second control state signal based on the updated control state of the first control module. The first control module comprises a first access handler configured to control a read channel for read access and a write channel for write access from a corresponding master, and the second control module comprises a second access handler configured to control a read channel for read access and a write channel for write access from a corresponding master. The first control module further comprises a first signal generating unit configured to generate a first control state signal based on an access control state of the first access handler, and the second control module further comprises a second signal generating unit configured to generate a second control state signal based on an access control state of the second access handler. The communication channel comprises at least one register configured to store the first control state signal and the second control state signal.

In another embodiment of the inventive concept, a bus system of a system on chip (SOC) comprises a plurality of masters, a plurality of slaves, a plurality of control modules configured to connect the plurality of masters and the plurality of slaves in a point-to-point connection, and a plurality of communication channels configured to connect the plurality of control modules to each other. One of the control modules, in responsive to a locking access preparation request from a corresponding one of the masters, is configured to generate a control state signal and transmit the control state signal to other control modules via the plurality of communication channels.

The control state signal is generated when the corresponding one of the masters is allowed to access one of the slaves. The other control modules, in response to the control state signal, restrict the other masters other than the corresponding one of the masters from accessing the one of the slaves. The communication channel comprises at least one register that stores a control state signal.

The plurality of control modules each includes a finite state machine, the finite state machine having control states of an idle state, a locking state, a locked state, and an unlocked state. The other control modules, in response to the control state signal, change control states of their finite state machines to that of the one of the control modules that generates the control state signal.

In yet another embodiment of the inventive concept, a method of operating a bus system in a locked access mode comprises a step of allowing one of a plurality of masters to access one of a plurality of slaves through a control module arranged between the one of the masters and the one of slaves and a step of restricting other masters from accessing the one of a plurality of slaves through other control modules connecting the other masters and the one of a plurality of slaves in accordance with a control state signal.

The control module performs the step of allowing one of a plurality of master by performing a step of receiving a first access request having a locking access preparation request signal from the one of a plurality of masters and changing its control state from an idle state to a locking state in response to the locking access preparation request signal, a step of requesting an access preparation to the one of a plurality of slaves, a step of receiving a locking access preparation signal from the one of a plurality of slaves and changing its control state from the locking state to a locked state, and a step of generating the control state signal.

The method of operating a bus system in a locked access mode comprises further comprises a step of changing the locked state to an unlocking state upon receiving a second access request that does not include a locking access preparation request signal, and wherein the other control modules includes a step of changing their control states to that of the control module in response to the control signal.

BRIEF DESCRIPTION OF THE DRAWINGS

Exemplary embodiments of the inventive concept will be more clearly understood from the following detailed description taken in conjunction with the accompanying drawings in which.

DETAILED DESCRIPTION OF THE EMBODIMENTS

Figure 1:
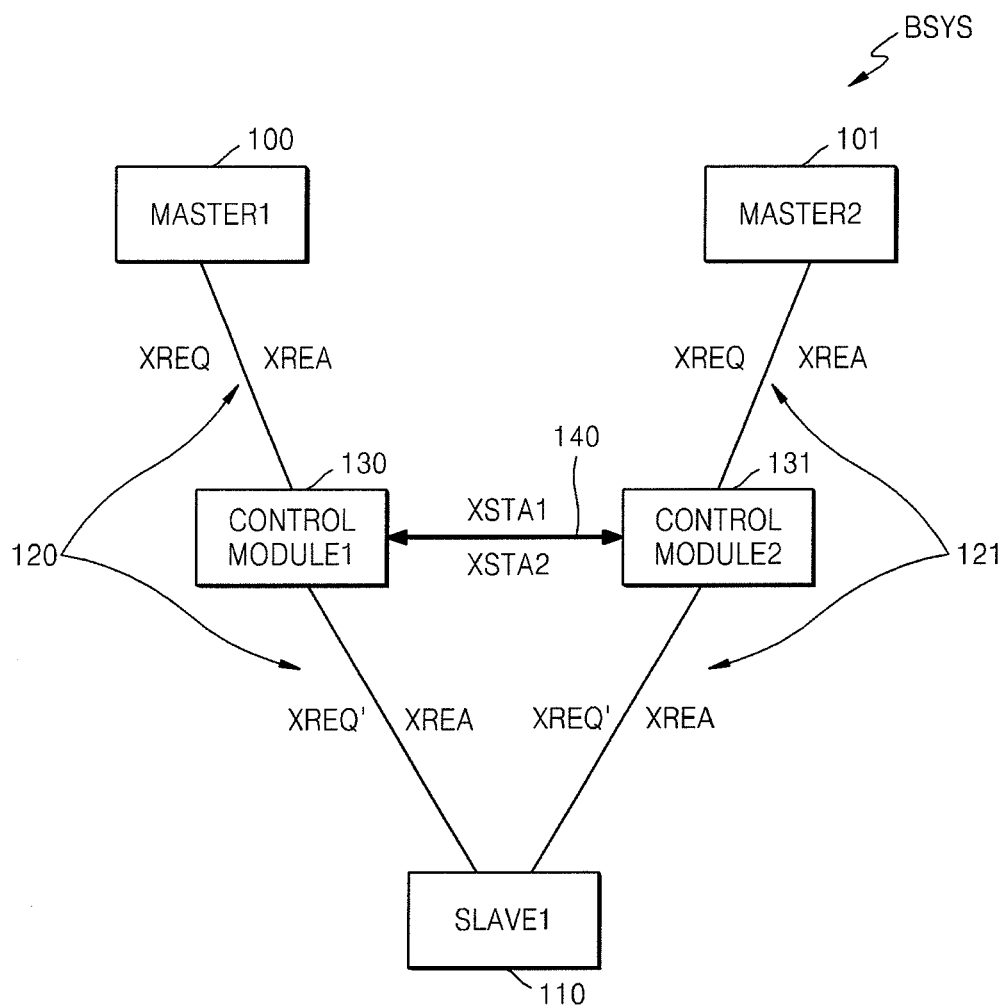
FIG. 1 is a block diagram illustrating a bus system of a system on chip (SoC) according to an embodiment of the inventive concept.

The inventive concept will now be described more fully with reference to the accompanying drawings, in which exemplary embodiments of the invention are shown. The invention may, however, be embodied in many different forms and should not be construed as being limited to the embodiments set forth herein; rather, these embodiments are provided so that this disclosure will be thorough and complete, and will fully convey the concept of the invention to those skilled in the art. In the drawings, like reference numerals denote like elements.

FIG. 1 is a block diagram illustrating a bus system BSYS of a system on chip (SoC) according to an embodiment of the inventive concept. As illustrated in FIG. 1, the bus system BSYS includes a first master 100, a second master 101, a first slave 110, a first control module 130, a second control module 131, and a communication channel 140. The first control module 130 connects the first master 100 and the first slave 110. The second control module 131 connects the second master 101 and the first slave 110. The first control module 130 and the second control module 131 are connected to each other via the communication channel 140.

The first master 100 or the second master 101 illustrated in FIG. 1 may be a processor or a direct memory access (DMA) controller that demands data in an embedded system. The first slave 110 may be a memory or an input/output device that responds to the first or second master 100 or 101. For example, when the first master 100 is a central processing unit (CPU) and the first slave 110 is a memory device, the first master 100 may read or write data from or to the first slave 110. As such, an access of the first and second masters 100 and 101 may be a read or write access.

A first interface 120 and a second interface 121 of FIG. 1 respectively transmit data requested by a master and respective first and second control signals between corresponding master and slave, that is, from the master to the slave (write) or from the slave to the master (read). The first control module 130 controls the first interface 120 between the first master 100 and the first slave 110, and the second control module 131 controls the second interface 121 between the second master 101 and the first slave 110. The first control module 130 and the second control module 131 control interfaces between intellectual properties (IPs) may use an Advanced Microcontroller Bus Architecture (AMBA) bus protocol provided by ARM. Alternatively, the first control module 130 and the second control module 131 may use a CoreConnect method by IBM, a μNetwork method by Sonics, or an Avalon switch fabric method by Altera.

Embodiments of the inventive concept will be explained based on the AMBA 3.0 AXI protocol of an AMBA bus protocol. The AMBA 3.0 AXI protocol is a bus protocol that is improved from AMBA 2.0 which is a representative interfacing technique of on-chip-communication for design of embedded microcontrollers, and is based on multi-channels. The AMBA 3.0 AXI protocol supports a multi-layer bus in which a plurality of independent single-layer buses are connected via bridges to each other and is designed in consideration of being used in a network-on-chip (NoC).

Characteristics of an AXI protocol are: a burst-based address structure; a one-way channel operated independently without interactive connectivity and one-way signal transmission; out-of-order for giving IDs to transactions; and supporting a multiple outstanding. Also, the AXI protocol provides independent addresses and data channels to maximize clock frequency and reduce a standby time, and can be easily used in various fields from point-to-point systems to multi-layer systems. In addition, masters each may access one of slaves in one of three access modes or methods of a normal access, an exclusive access, and a locked access.

The first interface 120 and the second interface 121 of FIG. 1 may each include four channels: an address channel, a read data channel, a write data channel, and a write response channel. The address channel includes a read address channel and a write address channel. Meanwhile, referring to FIGS. 4A and 4B and FIGS. 5A and 5B, as an example that is realized using the AXI protocol, a read address channel and a read data channel are illustrated as read channels, and a write address channel, a write data channel, and a write response channels are illustrated as write channels, as will be described in detail below.

The first master 100 of FIG. 1 requests access to the first slave 110, the first control module 130 generates a first control state signal XSTA1, and as the second master 101 requests access to the first slave 110, the second control module 131 generates a second control state signal XSTA2. The communication channel 140 connects the first control module 130 and the second control module 131 so that the first and second control modules 130 and 131 transmit or receive respective control state signals XSTA1 and XSTA2 from or to each other.

In operation, the bus system BSYS that operates in a locked access according to the inventive concept will be described. Referring to FIG. 1, the first master 100 transmits an access request signal XREQ regarding the first slave 100 to the first control module 130. The first control module 130, which has received the access request signal XREQ, transmits an access preparation request signal XREQ' to the first slave 110, and the first slave 110 transmits an access preparation signal XREA to the first control module 130. The first control module 130 transmits the access preparation signal XREA to the first master 100, and the first master 100 performs access to read or write data from or to the first slave 110.

Meanwhile, the first control module 130 receives the access request signal XREQ of the first master 100, and transmits the first control state signal XSTA1 to the second control module 131 while permitting an access. The first control state signal XSTA1 makes a control state of the second control module 131 to be consistent with a control state of the first control module 130 so as to control accesses of the first master 100 and the second master 101. The function of the second master 101 performing access to the first slave 110 and the function of the second control state signal XSTA2 are the same as the function of the first master 100 performing an access and the function of the first control state signal XSTA1 described above, and thus, a description thereof is not provided.

The bus system BSYS illustrated in FIG. 1 may be realized by the AXI protocol described above. In this case, the first control module 130, the second control module 131, and the communication channel 140 may function as an interconnect that arbitrates accesses of masters to predetermined slaves. The interconnect is an element of a bus system based on a typical AXI protocol, and is connected to a plurality of IPs, that is, a plurality of masters and slaves. The interconnect functions as an arbiter and a decoder in the AMBA 2.0 standard AHB bus system.

To describe the function of the interconnect, the functions of the arbiter and the decoder will be described. In order that masters can use buses to access slaves, the arbiter gives a right to masters such that only one master uses a bus at one time by arbitrating use of a bus between a plurality of masters using a fixed priority method or a round-robin method. The decoder decodes an address of a slave to which a master is to transmit data. That is, the interconnect, which performs the functions of the arbiter and the decoder, may perform arbitration by selecting one bus master among access requests by a plurality of masters and transmitting a data processing preparation request to a corresponding slave so as to process the corresponding data. As such, the first control module 130, the second control module 131, and the communication channel 140 may perform the function of the interconnect via the access control operation described above.

To clearly describe the purpose and effect of the embodiments of the inventive concept, a control operation of the bus system BSYS illustrated in FIG. 1 regarding a locked access will be described with reference to FIGS. 2 and 3. The locked access method is one of the above-described three access methods provided to a master in the AXI protocol. In a locked access method, when one of a plurality of masters requests locked access to a slave, only a connection between the one master and the slave occupies a bus until a burst transmission is ended. In this case, other masters than the connected master are restricted from occupying the bus and thus cannot access other slaves but have to be on standby until the access of the connected master is ended.

The locked access method is required to consider all information from the masters, the slaves, and the control modules, and thus floor planning of all the IPs needs to consider that limitation of the locked access method, considering the sizes and positions of the IPs. Also, even though the locked access method does not occur frequently in consideration of the total performance of the bus system, the locked access method is sensitive to floor planning. However, according to the current embodiment of the inventive concept using a plurality of control modules, the locked access method may be implanted in SoC device, minimizing the sensitivity to floor planning.

Figure 2:
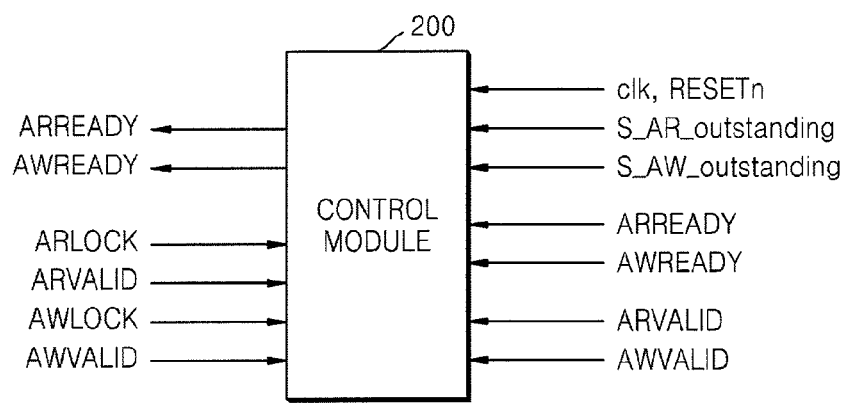
FIG. 2 illustrates a locked access control logic of a control module according to an embodiment of the inventive concept.

FIG. 2 illustrates a locked access control logic of a control module 200 according to an embodiment of the inventive concept. The control module 200 corresponds to the first control module 130 and the second control module of FIG. 1. The control module 200 receives locked access field information and valid data from a master, preparation signals ARREADY or AWREADY from a slave to perform a locked access between the master and the slave.

For example, it is assumed that the control module 200 is reset by receiving a reset signal RESETn, and performs a read locked access. First, the control module 200 receives a locking access preparation request signal ARLOCK transmitted from a master to request a locked access from a slave. The locking access preparation request signal ARLOCK is included in the access request signal XREQ. Then, the control module 200 requests an access preparation to a slave regarding which the master requests a locked access (the master transmits the access preparation request signal XREQ' of FIG. 1), and receives the locking access preparation signal ARREADY transmitted from the slave. The locking access preparation signal ARREADY is included in the access ready preparation signal XREA of FIG. 1. Then, the control module 200 transmits the locking access preparation signal ARREADY to the master. The master transmits valid data ARVALID or AWVALID in a locked state. Finally, if a last transaction of the valid data does not include a locking access preparation request signal ARLOCK, the control module ends the locked access and changes its state to an unlocked state. A write locked access is controlled in the same manner as the read locked access described above.

Figure 3:
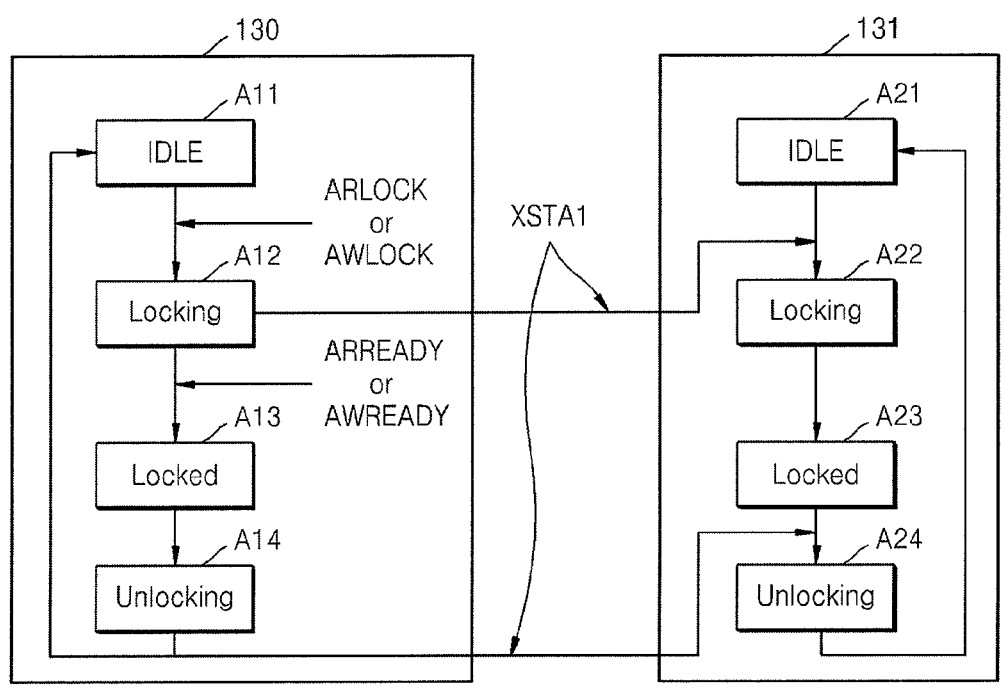
FIG. 3 is an exemplary state diagram illustrating locked access control states of the control module 130 and the second control module 131 illustrated in FIG. 1, according to an embodiment of the inventive concept.

FIG. 3 is an exemplary state diagram illustrating locked access control states of the control module 130 and the second control module 131 illustrated in FIG. 1, according to an embodiment of the inventive concept. Referring to FIG. 3, the first control module 130 and the second control module 131 control a locked access in the order of idle states A11 and A21, locking access preparation states A12 and A22 in which locked access request information is received and locked access is permitted, locked states A13 and A23, and unlocking states A14 and A24. The first control module 130 and the second control module 131 are connected to the communication channel 140 of FIG. 1, and a first control state signal XSTA1 may include access permission information and locked access unlocking information of the first control module 130.

As illustrated in FIG. 3, the first control module 130 receives a locking access preparation request signal ARLOCK or AWLOCK from the first master 100 to enter a locking access preparation state A12 and allow a locked access, and generates the first control state signal XSTA1 which includes locked access permission information. While requesting for a locking access preparation signal with respect to the first slave 110, the first control module 130 transmits the first control state signal XSTA1 to the second control module 131 via the communication channel 140 illustrated in FIG. 1. Accordingly, the second control module 131 enters a locking access preparation state A22, similar to the first control module 130, so as to enter a locked access state A23 in which a locked access is performed. When the locked access is ended, as the case of entering a locked state, the first control module 130 generates the first control state signal XSTA1 including locked access unlocking information and transmits the same to the second control module 131. Accordingly, the second control module 131, which is in the locked state A23, is unlocked like the first control module 130.

As can be seen from FIGS. 2 and 3, the first control module 130 and the second control module 131 are able to perform a locked access, which is performed by a typical interconnect, via the communication channel 140. However, when the interconnect controls a locked access, a placement and routing (P & R) freedom degree may be decreased due to the structure in which all IPs are connected to the interconnect; since only one master occupies the bus, a high speed operation of the bus system may be impossible due to additional standby time. However, in the bus system BSYS illustrated in FIG. 1, since control modules connected to each interface control an access of the IPs, the bus system BSYS is not sensitive to floor planning and the P & R freedom degree thereof is high (that is, P & R may be less restricted owing to an unrestricted interfacing between masters and slaves). For example, in the bus system BSYS, even when the masters and the slaves are separated apart or sizes of the masters and the slaves are fixed, channels may be disposed on a shortest route between the masters and the slaves. As such, according to the current embodiment of the inventive concept, a locked access may be performed even when the P & R freedom degree is high, and thus a decrease in an operational frequency may be prevented and a high frequency may be realized, thereby allowing a high speed operation of the bus system BSYS. A controlling operation of the locked access has been described above, but the embodiment of the inventive concept is not limited thereto. The current embodiment of the inventive concept may also be applied in various, limited floor planning situations.

Figure 4A:
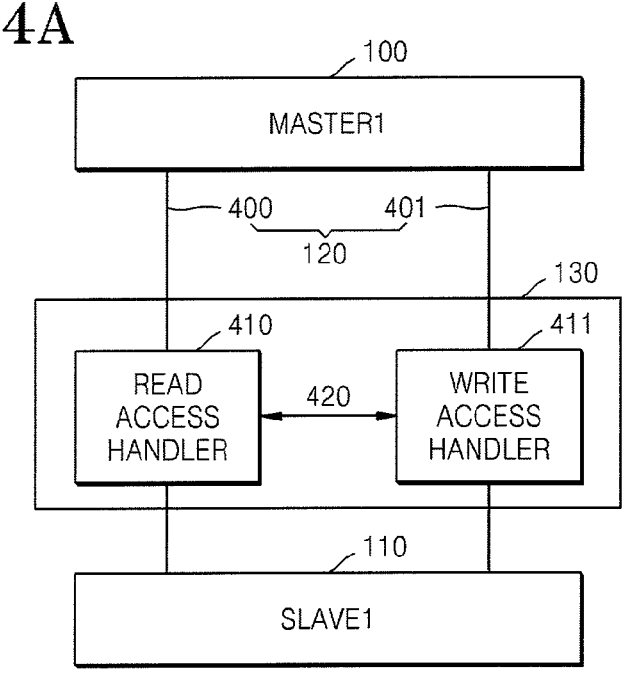
FIGS. 4A and 4B are block diagrams illustrating the control module of FIG. 1, according to embodiments of the inventive concept.
Figure 4B:
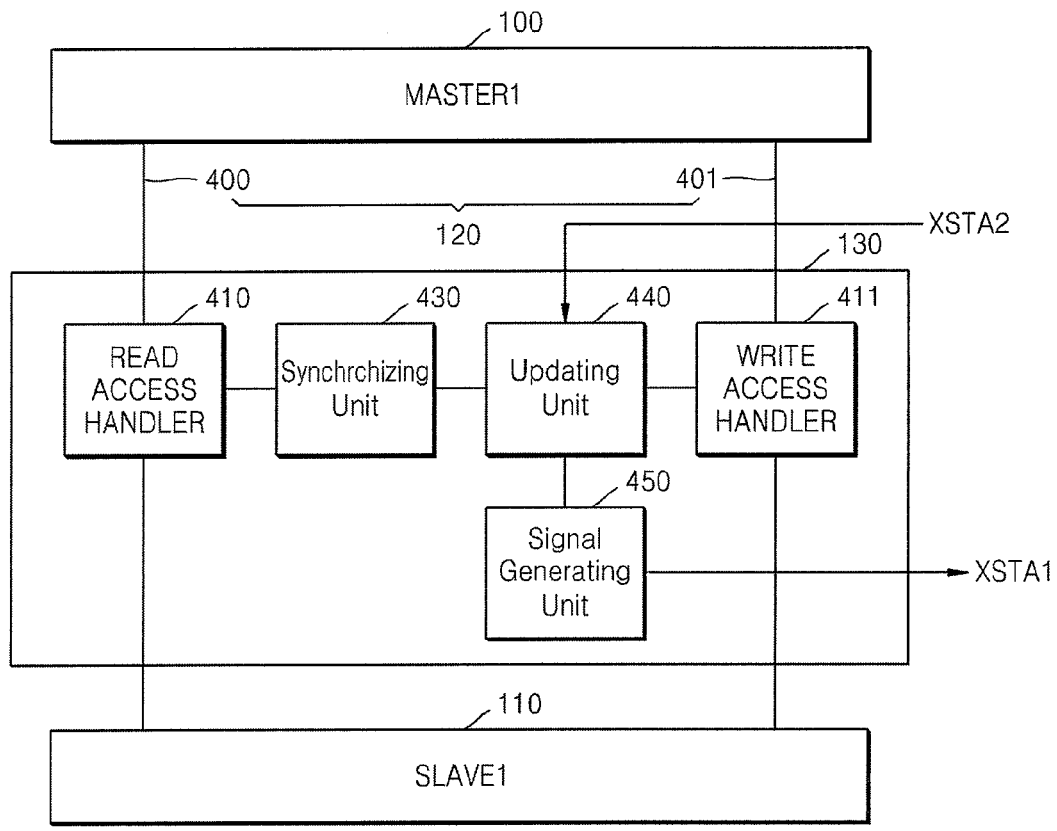

FIGS. 4A and 4B are block diagrams illustrating the first control module 130 of FIG. 1, according to embodiments of the inventive concept. While FIGS. 4A and 4B will now be illustrated with respect to only the first control module 130 of FIG. 1, FIGS. 4A and 4B may also apply to the second control module 131 of FIG. 1. The first control module 130 is implemented based on the above-described AXI protocol. In this case, a first interface 120 between the first master 100 and the first slave 110 may include a read channel 400, which is a reading path of data, and a write channel 401, which is a write path of data. A read access handler 410, which is connected to the read channel 400, controls the first master 100 performing a read access regarding valid data to the first slave 110. A write access handler 411, which is connected to the write channel 401, controls the first master 100 in performing a write access regarding valid data to the first slave 110. Access controlling operations of the read access handler 410 and the write access handler 411 are identical to the access control operations of the first control module 130 and the second control module 131 of FIG. 1, respectively. In addition, the read access handler 410 and the write access handler 411 are also connected to each other via a local communication channel 420 to transmit and receive respective control state information from and to each other.

FIG. 4B illustrates the first control module 130 according to another embodiment of the inventive concept. As illustrated in FIG. 4B, the first control module 130 may further include a synchronizing unit 430, an updating unit 440, and a signal generating unit 450. The synchronizing unit 430 is a finite state machine (FSM) having a finite number of states of the first control module 130 associated with a locked access. The states, as shown in FIG. 3, include an idle state, a locking state, a locked state, and an unlocking state. Transition of such states is triggered by a locking access preparation request signal ARLOCK or AWLOCK. The updating unit 440 updates an access control state of the first control module 130, including the read access handler 410 and the write access handler 411, by referring to an access control state of each of the read access handler 410 and the write access handler 411. When the access control state is updated by using the updating unit 440, the updated access control state is referred to by the signal generating unit 450 to generate a first control state signal XSTA1 of the first control module 130.

A locked access control operation of the first control module 130 by using the read access handler 410 will be described in detail with reference to FIGS. 2 and 3. Like the embodiment of FIGS. 2 and 3, it is assumed that the first control module 130 implemented based on an AXI protocol controls a locked access. When the read access handler 410 receives a locking access preparation request signal ARLOCK to permit a read locked access, the first control module 130 is updated by the updating unit 440 to the locking access preparation state A12 of FIG. 3. Then, the signal generating unit 450 generates a first control state signal XSTA1 by referring to the updating unit 440 and transmits the same to the second control module 131. Since the second control module 131 also includes an updating unit which is identical to the updating unit 440 of the first control module 130, when the second control module 131 receives a first control state signal XSTA1, the updating unit updates the second control module 131 to be in the locked state A22 of FIG. 3, and the second control module 131 is in the locked access state A23, accordingly. The same applies when a write access is requested to the write access handler 411. As such, as the read access handler 410 and the write access handler 411 are separately included, the P & R freedom degree may be further increased, thereby reducing sensitivity of the bus system BSYS to floor planning.

Figure 5A:
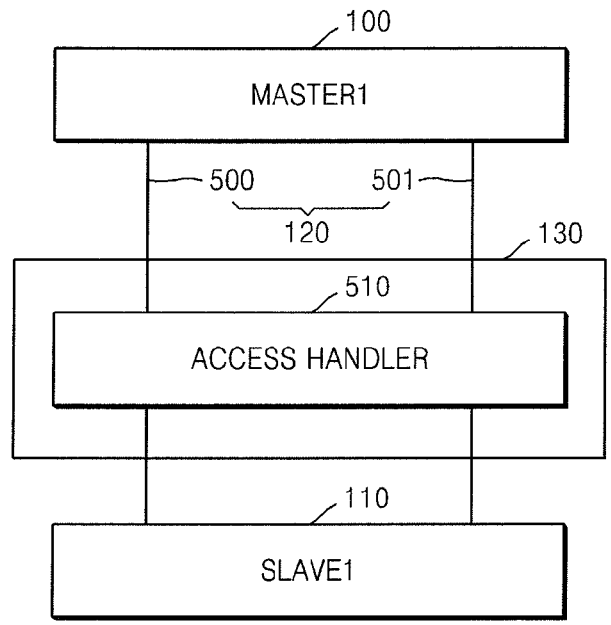
FIGS. 5A and 5B are block diagrams illustrating the control module of FIG. 1, according to other embodiments of the inventive concept.
Figure 5B:
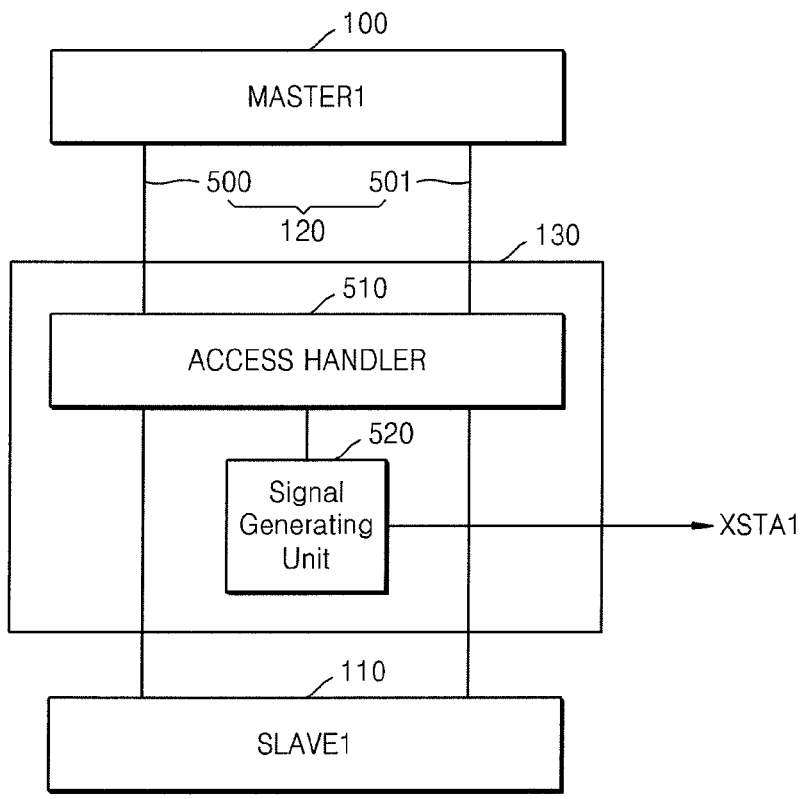

FIGS. 5A and 5B are block diagrams illustrating a first control module 130 of FIG. 1, according to other embodiments of the inventive concept. While FIGS. 5A and 5B will now be illustrated with respect to only the first control module 130 of FIG. 1, FIGS. 5A and 5B may also apply to the second control module 131 of FIG. 1. The first control module 130 is also implemented based on the above-described AXI protocol. However, unlike the embodiments of FIGS. 4A and 4B, the first control module 130 of FIG. 5A may include an access handler 510, which is commonly connected to a read channel 500 and a write channel 501. The access handler 510 may control read and write accesses. Also, as illustrated in FIG. 5B, the first control module 130 may further include a signal generating unit 520 that generates a first control state signal XSTA1 of the first control module 130. Read and write access control operations of the access handler 510 are identical to that of the first control module 130 illustrated in FIG. 1.

Figure 6:
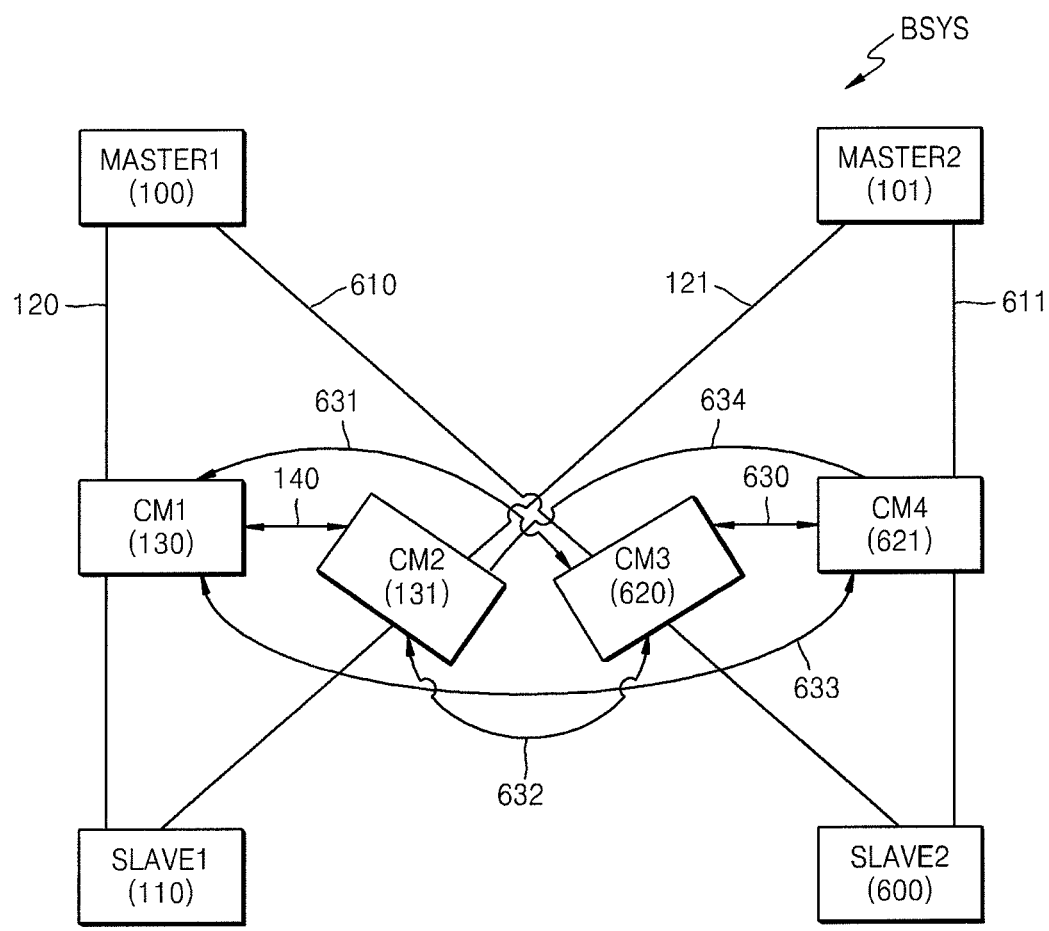
FIG. 6 is a block diagram illustrating a bus system according to another embodiment of the inventive concept.

FIG. 6 is a block diagram illustrating a bus system BSYS according to another embodiment of the inventive concept. For simplicity of explanation, the bus system BSYS is assumed to include two masters and two slaves. It may include more than two masters and more than two slaves, and the same inventive concept explained below will be applied. In addition to the elements of FIG. 1, the bus system BSYS of FIG. 6 further includes a second slave 600, a third control module 620, a fourth control module 621, and communication channels 140, 630, 631, 632, 633, and 634. The third control module 620 connects a first master 100 and the second slave 600, controlling a third interface 610. The fourth control module 621 connects a second master 101 and the second slave 600, controlling a fourth interface 611. Each master connects to the two slaves in a point-to-point connection. For example, the first master 100 is connected to the first slave 110 through the first control module 130 and to the second slave 600 through the third control module 620. The second master 101 is connected to the first slave 110 through the second control module and to the second slave 600 through the fourth control module 620.

Like the first interface 120 and the second interface 121, the third interface 610 and the fourth interface 611 may each include four channels, e.g., an address channel, a read channel, a write channel, and a write response channel, and data requested by the master is transmitted between corresponding master and slave, e.g., from the master to the slave (write) or from the slave to the master (read). The communication channels 630, 631, 632, 633, and 634 perform the same function as that of the communication channel 140 illustrated in FIG. 1. The third control module 620 and the fourth control module 621 also perform the same function as those of the first and second control modules 130 and 131 described above.

Access control operations of the masters of the bus system BSYS illustrated in FIG. 6 may be understood through the locked access control operations of the bus system BSYS based on the AXI protocol in relation to FIGS. 1, 2, and 3. Each control state signal generated by the control modules 130, 131, 620, and 621 may restrict access to a corresponding slave from all the other control modules except their own control module that generates the control state signal. For example, it is assumed that the first master 100 accesses to the first slave 110 in a locked access. The first control module 130 generates a first control state signal upon a request for locked access to the first slave 110. In response to the first control state signal, the second control module 131, the third control module 620, and the fourth control module 621 restricts the second master 101 from accessing the first slave 110. The control modules 130, 131, 620, and 621 operates in a similar way that was described with reference to FIG. 1, and thus further description thereof will not be provided here.

Figure 7:
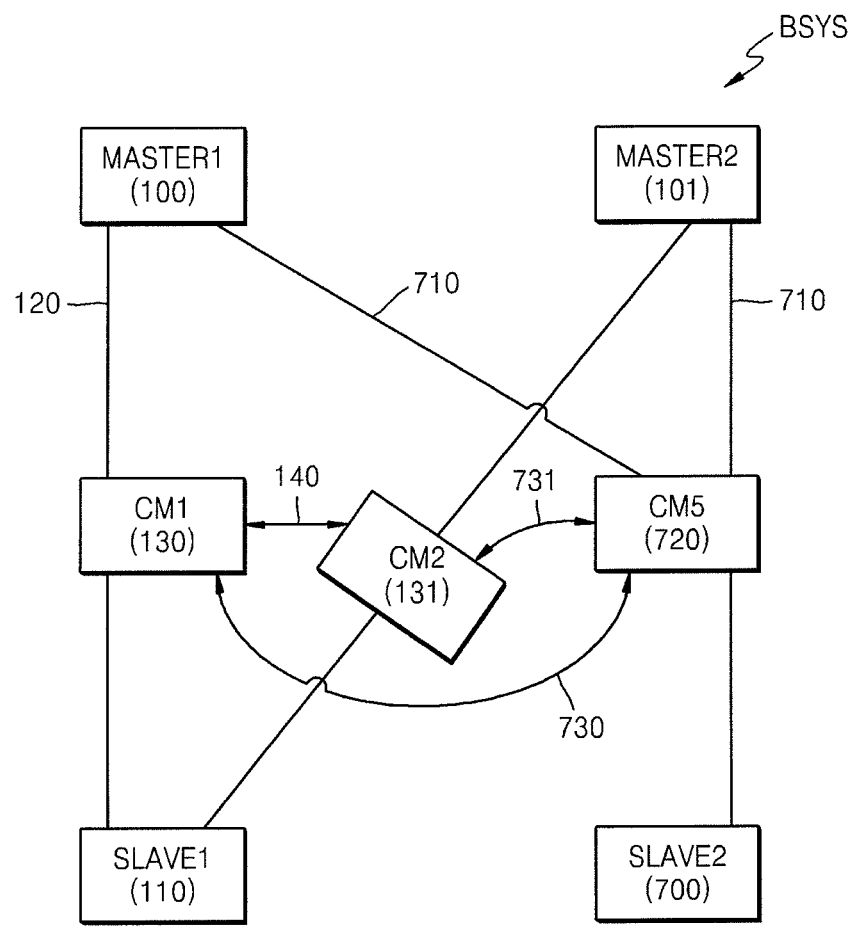
FIG. 7 is a block diagram illustrating a bus system according to another embodiment of the inventive concept.

FIG. 7 is a block diagram illustrating a bus system BSYS according to another embodiment of the inventive concept. In addition to the bus system BSYS of FIG. 2, the bus system BSYS of FIG. 7 may further include a fifth control module 720 that connects a first master 100 and a second master 101 to a second slave 700, controlling a fifth interface 710. Communication channel 730 connects the fifth control module 720 to the first control module 130. Communication channel 731 connects the fifth control module 720 to the second control module 131.

The control modules 130, 131, and 720 may be distributed on a SoC. The distributed control modules 130, 131, and 720 may operate in a similar way that was described with reference to FIG. 1 when the bus system BSYS operates in a locked access. The distributed control modules 130, 131, and 720 may give flexibilities to placing & routing (P & R) of the masters 100 and 101 and the slaves 110 and 700 on the SoC. For example, the second slave 700 may be placed closer to the first master 100 and the second master 101 than the first slave 110.

The fifth control module 720 may be connected to the first master 100 and the second master 101, and may also be connected to the second slave 700. Because the first master 100 and the second master 101 may compete to own the second slave 700 through the fifth control module 720, the fifth control module 720 may also arbitrate accesses from the first and second masters 100 and 101. Specifically, the fifth control module 720 may grant priority to a predetermined master who will occupy the bus system for a locked access. The additional functions of an arbiter and a decoder were described above, and thus a description thereof will be omitted. When a bus system may be designed to include a plurality of masters and a plurality of slaves based on the embodiments of FIGS. 6 and 7 described above, the bus system structure for a locked access and operations thereof may be modified in various manners.

Figure 8:
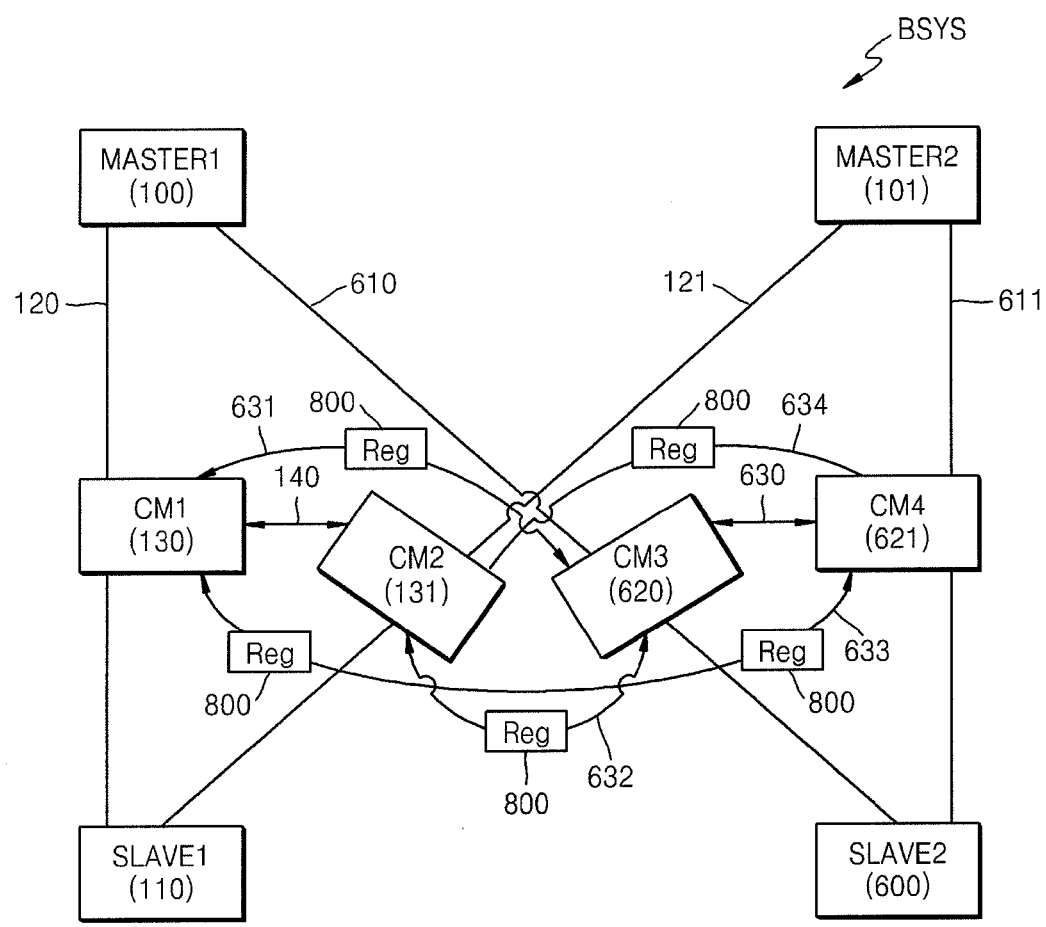
FIG. 8 is a block diagram illustrating a communication channel including a register according to an embodiment of the inventive concept.

FIG. 8 is a block diagram illustrating a communication channel including a register 800 according to an embodiment of the inventive concept. The bus system BSYS of FIG. 8 is similar to that of FIG. 6. The communication channels 631, 634, 633, 140, 630, and 632 include a register 800. As illustrated in FIG. 8, for routing of a communication channel that connects control modules, routing environments such as channel length and wire confusion may be important. Methods for pipelining by connecting the register 800 may be provided according to the routing environments. In general, in a pipelining method, a processing speed is improved by starting execution of next input data before execution of a predetermined input data is ended. The register 800 performs the function of storing usually small-sized data; in the current embodiment, the register 800 temporarily stores a control state signal to perform pipelining.

Referring to FIG. 6, the communication channels 140, 630, 631, 632, 633, and 634 connecting between control modules are illustrated on a shortest route in FIG. 8. However, in a substantial SoC design, the sizes of IPs, a width of wires according to required bandwidth, etc. are to be considered, and thus there may be various floor planning situations. In this case, timing closure, which refers to designing all parts of a SoC so as to operate identically at an operational frequency, is difficult, and thus, at least one register 800 may be connected for timing closure between IPs in the bus system BSYS. For example, a flip flop or latch circuit may be used as the register 800.

While the inventive concept has been particularly shown and described with reference to exemplary embodiments thereof, it will be understood that various changes in form and details may be made therein without departing from the spirit and scope of the following claims.

What is claimed is:

1. A method of operating a bus system in a locked access mode, the method comprising steps of:
   allowing one of a plurality of masters to access one of a plurality of slaves through a control module arranged between the one of the masters and the one of the plurality of slaves; and
   restricting other masters from accessing the one of the plurality of slaves through other control modules that are configured to connect at least one of the plurality of masters and the one of the plurality of slaves in accordance with a control state signal,
   wherein the step of allowing the one of the plurality of masters to access the one of the plurality of slaves comprises steps of:
   receiving a first access request having a locking access preparation request signal from the one of the plurality of masters;

changing a control state of the control module from an idle state to a locking access preparation state in response to the locking access preparation request signal;

sending an access preparation request signal to the one of the plurality of slaves;

receiving an access preparation signal from the one of the plurality of slaves;

changing the control state of the control module from the locking access preparation state to a locked state;

sending the control state signal to the other control modules; and changing, in response to the control state signal, control states of the other control modules from an idle state to a locking access preparation state.

2. The method of claim 1, further comprising a step of changing the locked state to an unlocking state upon receiving a second access request that does not include a locking access preparation request signal, and wherein the other control modules perform a step of changing their control states to that of the control module in response to the control state signal.

* * * * *